United States Patent
Homes et al.

(10) Patent No.: US 7,421,663 B2
(45) Date of Patent: Sep. 2, 2008

(54) GRAPHICAL USER INTERFACE DESIGN FOR MULTIPLE SETTINGS/VALUES RELATED TO AN ITEM

(75) Inventors: Alix A. Homes, Costa Mesa, CA (US); Marcia Weinberger, Sherman Oaks, CA (US)

(73) Assignee: Xerox Corporation, Norwalk, CT (US)

( * ) Notice: Subject to any disclaimer, the term of this patent is extended or adjusted under 35 U.S.C. 154(b) by 442 days.

(21) Appl. No.: 11/138,311

(22) Filed: May 27, 2005

(65) Prior Publication Data

US 2006/0271876 A1    Nov. 30, 2006

(51) Int. Cl.
G06F 3/048    (2006.01)

(52) U.S. Cl. .................. 715/777; 715/771; 715/716; 715/722; 715/735; 715/779

(58) Field of Classification Search .............. 715/771, 715/777, 716, 722, 735, 779, 790, 810, 840, 715/845

See application file for complete search history.

(56) References Cited

U.S. PATENT DOCUMENTS

| | | | | |
|---|---|---|---|---|
| 5,241,624 | A * | 8/1993 | Torres ..................... | 715/790 |
| 5,297,250 | A | 3/1994 | Leroy et al. | |
| 5,533,184 | A | 7/1996 | Malcolm | |
| 5,579,446 | A * | 11/1996 | Naik et al. ................. | 358/1.9 |
| 5,664,127 | A * | 9/1997 | Anderson et al. .......... | 715/776 |
| 5,764,226 | A | 6/1998 | Consolatti et al. | |
| 5,956,031 | A | 9/1999 | Berteig et al. | |
| 5,963,216 | A * | 10/1999 | Chiarabini et al. ......... | 345/660 |
| 6,002,398 | A * | 12/1999 | Wilson ...................... | 715/777 |
| 6,166,736 | A * | 12/2000 | Hugh ........................ | 715/798 |
| 6,230,304 | B1 | 5/2001 | Groeneveld et al. | |
| 6,288,720 | B1 * | 9/2001 | Zimmerman et al. ....... | 715/810 |
| 6,335,795 | B1 * | 1/2002 | Neuhard et al. ............ | 358/1.15 |
| 6,362,892 | B1 * | 3/2002 | Lee et al. ................... | 358/1.13 |
| 6,535,229 | B1 * | 3/2003 | Kraft ......................... | 715/764 |
| 6,587,129 | B1 * | 7/2003 | Lavendel et al. ........... | 715/776 |
| 6,595,126 | B2 * | 7/2003 | Nagao et al. ............... | 101/115 |
| 6,941,523 | B1 * | 9/2005 | Mathieson .................. | 715/809 |
| 7,283,257 | B2 * | 10/2007 | Bright et al. ............... | 358/1.1 |
| 2001/0026290 | A1 * | 10/2001 | Machida et al. ............ | 345/810 |
| 2005/0057512 | A1 * | 3/2005 | Du et al. .................... | 345/168 |

* cited by examiner

*Primary Examiner*—Weilun Lo
*Assistant Examiner*—Rashedul Hassan
(74) *Attorney, Agent, or Firm*—Ronald E. Prass, Jr.; Prass & Irving, LLP

(57) ABSTRACT

A Graphical User Interface is provided that presents multi-level configurable parameter values for an item in a condensed and scannable format. The GUI enables a user to clearly and quickly discern the relationship between the parameters. The GUI can also reflect modifications to parameters that result from a selection of a parameter value. The GUI can be used to define options and related settings on a form or client GUI, such as a job ticket.

24 Claims, 3 Drawing Sheets

GRAPHICAL USER INTERFACE DESIGN FOR MULTIPLE SETTINGS/VALUES RELATED TO AN ITEM

BACKGROUND

1. Field of the Technology

The present disclosure relates to a method, system, and computer program product for presenting configurable parameter values relating to an item. More particularly, the present disclosure relates to a method, system, and computer program product for presenting configurable parameter values relating to an item using a condensed and scannable table showing multi-level parameters relating to the item.

2. Description of the Prior Art

Graphical User Interfaces ("GUIs") are used to display and configure multi-level parameter values related to an item. Typically, configuring multi-level parameter values has been accomplished using two techniques. One technique involves creating a feature group for an item having multiple parameter values. The feature group can be presented as a set of parameter values with selectable objects such as option buttons, checkboxes, modifiable fields, or as a pull down menu having selectable option buttons and/or checkboxes. Another technique involves creating a standard table for an item that displays each modifiable parameter value for the item. When presented, the parameter values convey a current state of the parameter for the item. While these techniques enable a user to visualize and configure, such as modify or select, parameter values as necessary, they have considerable drawbacks.

One drawback is the inability to easily scan the parameters presented using these techniques. It is often difficult to determine what parameter values relate to an item due to the parallax that is created when reading a GUI formatted as a table. Parallax is increase when there is a need to read multiple standard tables for an item.

Another drawback is that a valuable amount of screen space is used by both techniques. Screen space is at a premium because it is often desirable to visually confirm that the parameter values as configured are indeed the desired parameter values. Seeing information about the context of an item also helps the user make decisions on how to configure the item. The amount of screen space used by a standard table is typically driven by the width of each column heading, or the longest entry in the column that designates the parameter being configured. Likewise, the selection of a parameter that initiates the opening of a new window uses a substantial amount of screen space.

Another drawback is that of unnoticed parameter changes. There are occasions where the selection of a parameter value has an influence on what selections can be made following the selection of the parameter value or selections that were made prior to the selection of the parameter value. While GUIs reflect these changes, they can go unnoticed by the user and lead to unexpected results.

Accordingly, there is a need for a method, system, and computer program product for presenting configurable parameters relating to an item. There is a need for the method, system, and computer program product for presenting configurable multi-level parameters relating to an item. There is also a need for the multi-level parameters to be presented in a condensed and logical manner. There is also a need for the multi-level parameters to be presented in a table format. There is a need for the multi-level parameters to be presented to preserve screen space. There is also a need for the multi-level parameters to be presented in a manner that maintains and makes it easy to discern a logical relationship between the parameters. There is also a need for the multi-level parameters to be presented in a manner that reflects modifications to parameter values as a result of the selection of a parameter value.

SUMMARY OF DISCLOSURE

According to embodiments of the present disclosure, a method, system, and a computer program product for presenting configurable multi-level parameters relating to an item are provided. To configure the item a condensed and scannable GUI of multilevel configurable parameter value is present for the item. The GUI enables a user to clearly and quickly discern the relationship between the parameters. The GUI can also reflect modifications to parameters that result from a selection of a parameter value related to the item. The GUI can be used to define options and related settings on a form or client GUI, such as a job ticket.

BRIEF DESCRIPTION OF THE DRAWINGS

The above described features and advantages of the present disclosure will be more fully appreciated with reference to the detailed description and appended figures in which.

DETAILED DESCRIPTION OF DISCLOSURE

The subject matter of the present disclosure is now described more fully hereinafter with reference to the accompanying drawings that show exemplary embodiments. The subject matter of the present disclosure, however, may be embodied in many different forms and should not be construed as limited to the embodiments set forth herein. Appropriately, these embodiments are provided so that this disclosure will be thorough and complete, and will fully convey the scope of the disclosed subject matter.

According to embodiments of the present disclosure, a method, system, and a computer program product for presenting configurable multi-level parameters relating to an item are provided. To configure the item a condensed and scannable GUI of multilevel configurable parameter value is present for the item. Configuration of an item includes, but is not limited to, the selection, modification and input of a parameter value associated with the item to obtain performance in accordance with the parameter value. An item includes, but is not limited to, an operational control, a feature, a function, and an attribute of a system.

The GUI enables a user to clearly and quickly discern the relationship between the parameters. The GUI can also reflect modifications to parameters that result from a selection of a parameter value related to the item.

Figure 1:
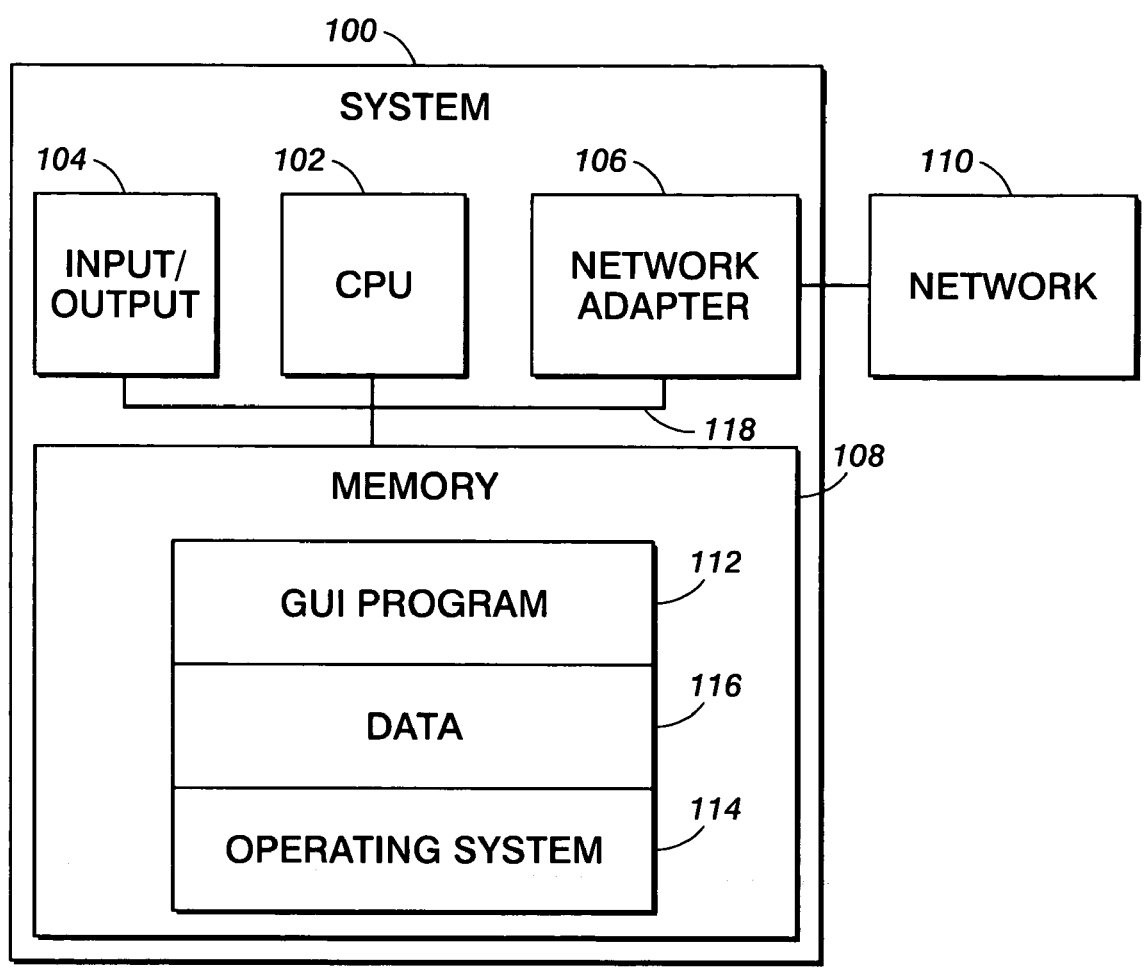
FIG. 1 depicts an exemplary functional block diagram of a device in which the present disclosure can find application.

FIG. 1 is an exemplary block diagram of a system 100 in which the present technology may be implemented. The user system 100 may include CPU 102, connected by a bus 118 or other suitable interface means to system memory 108. In the FIG. 1 embodiment of the present disclosure, CPU 102 is a microprocessor, such as an INTEL PENTIUM® or AMD® processor, but may be any processor that executes program instructions in order to carry out the functions disclosed herein. The network adapter 106 provides an interface between the system 100 and a network 110, such as the Internet.

The user system 100 can also include input/output circuitry 104 and network adapter 106. Input/output device circuitry 104 enables interaction with and execution of instructions by user system 100 as directed by a user. The input/output circuitry 104 provides an interface for the selection and modification of parameters and output of GUIs in accordance with the techniques disclosed by the present disclosure. The input/output circuitry 104 includes input devices, such as trackball, mice, touchpads and keyboards, and output devices, such as printers and monitors.

As shown in FIG. 1, the various components of the user system 100 communicate through a bus or similar architecture 118. Accordingly, systems memory 108 (i.e., a computer readable medium) is disposed in communication with CPU 102 through bus 118. Systems memory 108 includes GUI Program 112, operating system 114 and data 116. Operating system 114 provides overall system functionality. The GUI Program 112 enables the presentation and configuration of multi-level parameter values relating to an item in accordance with the present disclosure as discussed in detail herein below. The item can include, but is not limited to, an operational control and an attribute. The configuration of a parameter value includes, but is not limited to selection, editing and data entry.

Figure 2:
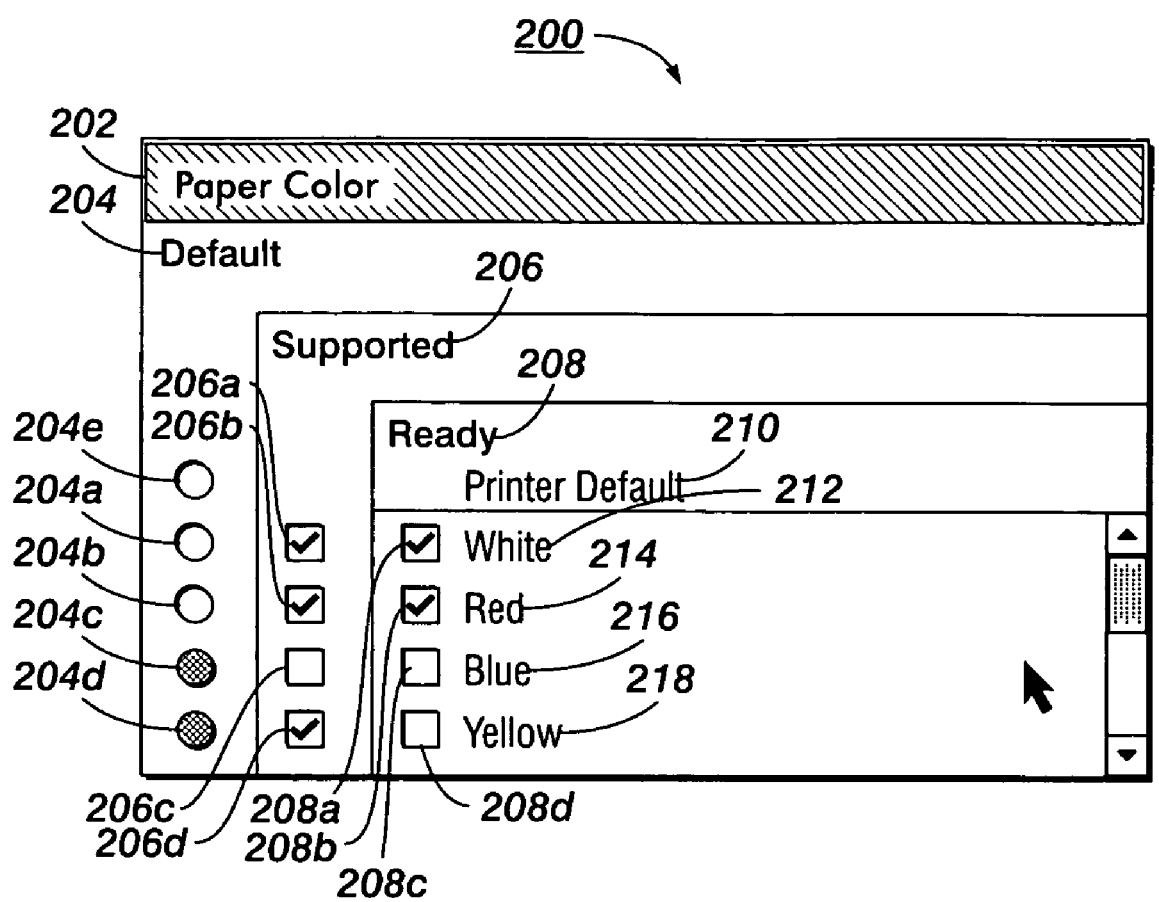
FIG. 2 depicts an exemplary graphical user interface in accordance with the present disclosure.

FIG. 2 depicts an exemplary graphical user interface in accordance with the disclosure. In the FIG. 2 embodiment of the present disclosure, the GUI 200 is presented as a condensed table including an item label 202, parameter labels 204-208, parameter value labels 210-218, selectable objects 204a-204e, selectable objects 206a-206d, and selectable objects 208a-208d. An item label 202 identifies a type of item including, but not limited to, a system attribute and a system control. In the FIG. 2 embodiment of the present disclosure, item label 202 identifies a printer attribute ("Paper Color") presented for configuration.

The parameter labels 204-208 identify the parameters associated with the attribute. In the FIG. 2 embodiment of the present disclosure, the parameters associated with the attribute "Paper Color" are "Default," "Supported," and "Ready." These are the parameters that have a relationship with the attribute "Paper Color" and can be set automatically by the system 100 or manually by a user to control the use of paper color in system 100. In the FIG. 2 embodiment of the present disclosure, the item label 202, and parameter labels 204-208 are stacked over one another and offset from each other a distance sufficient to place one or more selectable objects in a column under each of the parameter labels 204-208. The result is a condensed table having stacked and offset parameter labels 204-208 and selectable objects for the parameters forming the columns of the table.

The parameter value labels 210-218 identify the parameter values associated with the attribute. As shown in FIG. 2, each parameter value label 212-218 is associated with each of the parameters labels 204-208 and parameter value label 210 is associated with parameter label 204. For example, the parameter value "White" is a parameter value for each of the parameter labels "Ready," "Supported," and "Default."

In the FIG. 2 embodiment of the present disclosure, a set of selectable objects are provided in a column below each parameter label 204-208 and each selectable object in each set of selectable objects is adjacent to and associated with one of the parameter value labels 210-218. In the FIG. 2 embodiment of the present disclosure, each selectable object that is associated with a parameter label is also associated with a parameter value label. In the FIG. 2 embodiment of the present disclosure, selectable objects 204a, 206a and 208a are associated with the parameter value "White" and a respective one of the parameter value label 204, 206 and 208.

A selectable object can be one of a checkbox, a button, a drop down menu or the like. A checkbox, such as selectable objects 206a-206d and 208a-208d, can be selected or de-selected by a user. When a user positions the pointing device on a particular check box and clicks, the box toggles between a selected state, displayed as a box with a "✓" in it, and a de-selected state, displayed as an empty box. Multiple checkboxes in a column can be simultaneously selected, and each checkbox can be selected or de-selected independent of the states of the other checkboxes in the column. In the FIG. 2 embodiment of the present disclosure, selectable objects 206a, 206b, and 206d associated with parameter value labels 212, 214 and 218 have been selected for parameter label 206. This visually conveys the information that the values "White," "Red," and "Yellow" have been selected as "Supported" for the printer attribute "Paper Color." In the FIG. 2 embodiment of the present disclosure, selectable objects 208a and 208b associated with parameter value labels 212 and 214 have been selected for parameter label 208. This visually conveys the information that the values "White" and "Red" have been selected as "Ready" for the printer attribute "Paper Color."

A button, such as selectable objects 204a-204e, can be selected or de-selected by a user. When the user positions the pointing device on a particular button and clicks, the button toggles between a selected state, displayed as a circle with a solid dot in it, and a de-selected state, displayed as an empty circle. In contrast with the check boxes, however, only one button in a button column can be selected at any given time. In other words, if a user selects one button, all other buttons in the column are automatically de-selected. Thus, the states of the buttons are interdependent. Button columns are thus appropriate GUI controls for allowing a user to select a single item from among multiple mutually exclusive items.

The availability of a button for selection or de-selection can be based on the selection of checkboxes, buttons and/or a combination thereof related to the attribute. In the FIG. 2 embodiment of the present disclosure, when a checkbox or button is not available for selection it can be displayed "Greyed Out," such as selectable objects 204c and 204d, and disabled for selection. In the FIG. 2 embodiment of the present disclosure, the availability of selectable objects 204a-204d for selection is based on whether the selectable object, such as 206a, associated with a value, such as 212, is selected for both parameter labels, such as 206 and 208. In the FIG. 2 embodiment of the present disclosure, the check boxes associated with the value "Red" and "White" have been selected as "Supported" and "Ready" making the selectable objects 204a and 204b for parameter label 204 available for selection.

Figure 3:
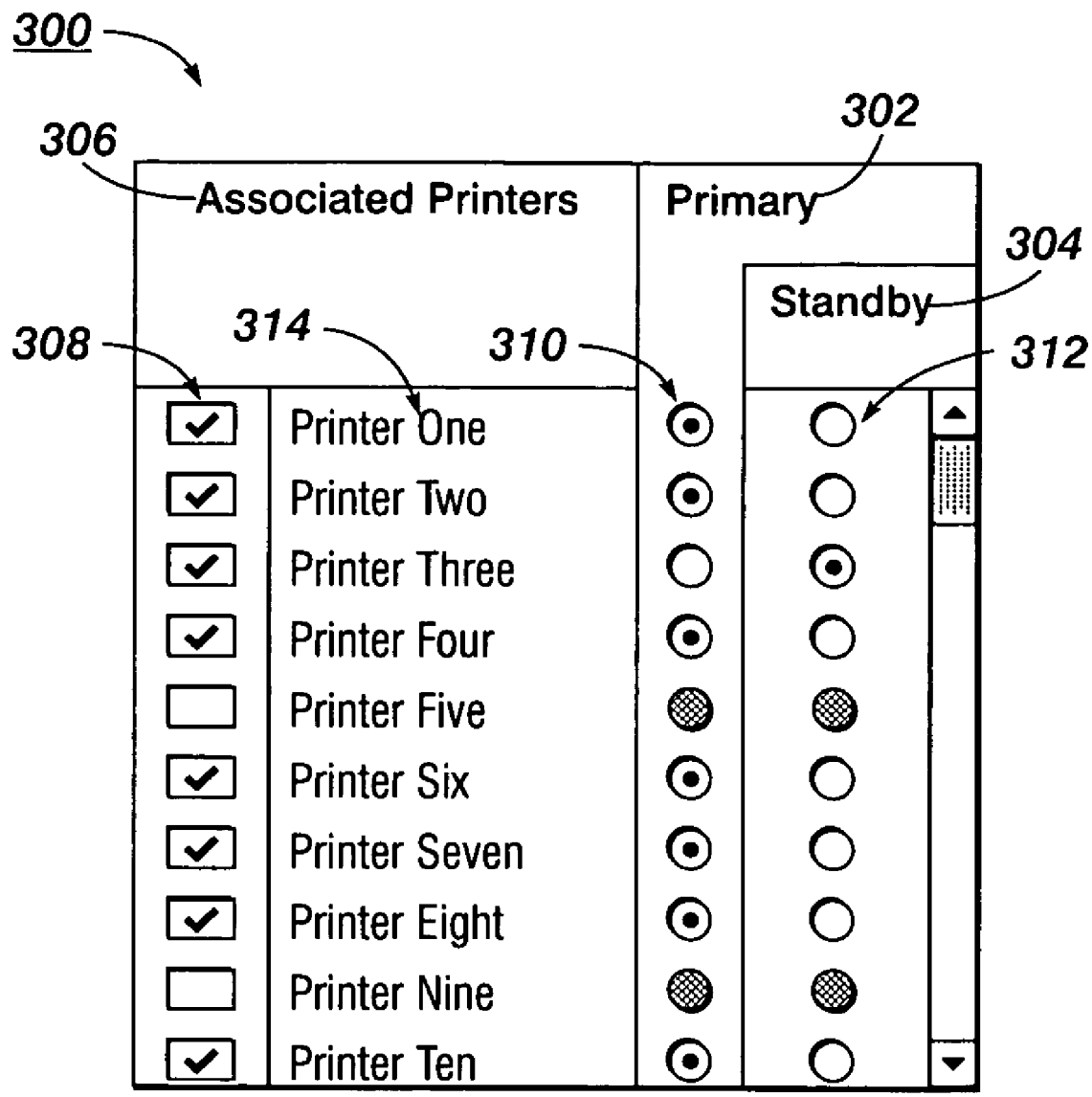
FIG. 3 depicts an exemplary graphical user interface in accordance with the present disclosure.

FIG. 3 depicts an exemplary graphical user interface in accordance with the present disclosure. In the FIG. 3 embodiment of the present disclosure, the GUI 300 is presented as a condensed table including an item label 306, parameter labels 302-304, parameter value labels 314, and selectable objects 308-312. In the FIG. 3 embodiment of the present disclosure, item label 306 identifies a printer control ("Associated Printers") presented for configuration.

The parameter labels 302 and 304 identify the parameters associated with the printer control. In the FIG. 3 embodiment of the present disclosure, the parameters associated with the printer control "Associated Printer" are "Primary" and "Standby." These are the parameters that have a relationship with the printer control "Associated Printer" and can be set to control the use of printers associated with a queue. In the FIG. 3 embodiment of the present disclosure, the parameter labels 302 and 304 are stacked over one another and offset from each other a distance sufficient to place selectable objects, such as 310 and 312, in a column under each of the parameter labels 302 and 304. The result is a condensed table having stacked and offset parameter labels 302-304 and selectable objects forming the columns of the table.

In the FIG. 3 embodiment, the GUI enables each associated printer listed in the GUI to be designated as either "primary" or "standby." In the FIG. 3 embodiment of the present disclosure, the availability of a selectable object 310 and 312 is based on whether the selectable object 308 adjacent to selectable the object 310 and 312 have been selected. Upon selection of a selectable object 308, the selectable objects 310 and 312 corresponding to the same parameter value are made available for selection. In an embodiment of the present disclosure, the selectable object 310 corresponding to the same parameter value is automatically selected. The selectable object 312 corresponding to the same parameter value can be selected to alter the automatic selection.

While specific embodiments of the present disclosure have been illustrated and described, it will be understood by those having ordinary skill in the art that changes can be made to those embodiments without departing from the spirit and scope of the disclosure.

What we claim is:

1. A method of presenting configurable multi-level parameter values relating to an item of a printing apparatus, the method comprising:
providing at least two parameter labels in a stacked configuration, wherein the beginning of each parameter label in the stacked configuration is on a different layer in the stacked configuration than the other parameter labels and is offset a distance from the beginning of a parameter label that is positioned directly above the respective parameter label; and
providing at least one selectable object below each of the at least two parameter labels in a column, wherein the at least one selectable object below a parameter label is positioned parallel to the at least one selectable object below of another parameter label of the at least two parameters;
wherein the at least two parameter labels and the at least one selectable object below each of the at least two parameter labels are visible at the same time and the selectable objects are operable to configure an item.

2. The method according to claim 1, further comprising providing an item label identifying the configurable item.

3. The method according to claim 1, wherein the parameter label identifies a parameter associated with the configurable item.

4. The method according to claim 3, further comprising providing a parameter value label adjacent the selectable objects.

5. The method according to claim 4, wherein the parameter value label identifies a value associated with the parameter.

6. The method according to claim 1, wherein the selectable objects are one of: a checkbox, a button, a dropdown menu and a textbox.

7. The method according to claim 2, wherein the printing apparatus is one of: a photocopier, a xerographic photocopier, a paper handler, a document finisher, a scanner, a printer, or a fax machine.

8. A computer program product for presenting configurable multi-level parameter values relating to an item of a printing apparatus comprising:
a computer readable medium; and
computer program instructions, recorded on the computer readable medium, executable by a processor, for performing the steps of:
providing at least two parameter labels in a stacked configuration, wherein the beginning of each parameter label in the stacked configuration is on a different layer in the stacked configuration than the other parameter labels and is offset a distance from the beginning of a parameter label that is positioned directly above the respective parameter label and
providing at least one selectable object below each of the at least two parameter labels in a column, wherein the at least one selectable object below a parameter label is positioned parallel to the at least one selectable object below of another parameter label of the at least two parameters;
wherein the at least two parameter labels and the at least one selectable object below each of the at least two parameter labels are visible at the same time and the selectable objects are operable to configure an item.

9. The computer program product according to claim 8, further comprising computer program instructions for providing an item label identifying the configurable item.

10. The computer program product according to claim 8, wherein the parameter label identifies a parameter associated with the configurable item.

11. The computer program product according to claim 10, further comprising providing a parameter value label adjacent the selectable objects.

12. The computer program product according to claim 11, wherein the parameter value label identifies a value associated with the parameter.

13. The computer program product according to claim 8, wherein the selectable objects are one of: a checkbox, a button, a dropdown menu and a textbox.

14. The computer program product according to claim 9, wherein the printing apparatus is one of: a photocopier, a xerographic photocopier, a paper handler, a document finisher, a scanner, a printer, or a fax machine.

15. A printing apparatus comprising:
a processor operable to execute computer program instructions; and
a memory operable to store computer program instructions executable by the processor, for performing the steps of:
providing at least two parameter labels in a stacked configuration, wherein the beginning of each parameter label in the stacked configuration is on a different layer in the stacked configuration than the other parameter labels and is offset a distance from the beginning of a parameter label that is positioned directly above the respective parameter label and
providing at least one selectable object below each of the at least two parameter labels in a column, wherein the at least one selectable object below a parameter label is positioned parallel to the at least one selectable object below of another parameter label of the at least two parameters;
wherein the at least two parameter labels and the at least one selectable object below each of the at least two parameter labels are visible at the same time and the selectable objects are operable to configure an item.

16. The printing apparatus according to claim 15, further comprising the memory operable to store computer program instructions executable by the processor, for performing the steps of providing an item label identifying the configurable item.

17. The printing apparatus according to claim 15, wherein the parameter label identifies a parameter associated with the configurable item.

18. The printing apparatus according to claim 17, further comprising the memory operable to store computer program instructions executable by the processor, for performing the steps of providing a parameter value label adjacent the selectable objects.

19. The printing apparatus according to claim 17, wherein the parameter value label identifies a value associated with the parameter.

20. The printing apparatus according to claim 16, wherein the printing apparatus is one of: a photocopier, a xerographic photocopier, a paper handler, a document finisher, a scanner, a printer, or a fax machine.

21. A method of presenting configurable multi-level parameter values relating to an item, the method comprising:
   providing at least two parameter labels in a stacked configuration, wherein the beginning of each parameter label in the stacked configuration is on a different layer in the stacked configuration than the other parameter labels and is offset a distance from the beginning of a parameter label that is positioned directly above the respective parameter label and
   providing at least one selectable object below each of the at least two parameter labels in a column, wherein the at least one selectable object below a parameter label is positioned parallel to the at least one selectable object below of another parameter label of the at least two parameters;
   wherein the at least two parameter labels and the at least one selectable object below each of the at least two parameter labels are visible at the same time and the selectable objects are operable to configure an item.

22. The method according to claim 21, wherein the item is for the operation of one of:
   a photocopier, a xerographic photocopier, a paper handler, a document finisher, a scanner, a printer, or a fax machine.

23. A system comprising:
   a processor operable to execute computer program instructions; and
   a memory operable to store computer program instructions executable by the processor, for performing the steps of:
      providing at least two parameter labels in a stacked configuration, wherein the beginning of each parameter label in the stacked configuration is on a different layer in the stacked configuration than the other parameter labels and is offset a distance from the beginning of a parameter label that is positioned directly above the respective parameter label and
      providing at least one selectable object below each of the at least two parameter labels in a column, wherein the at least one selectable object below a parameter label is positioned parallel to the at least one selectable object below of another parameter label of the at least two parameters;
   wherein the at least two parameter labels and the at least one selectable object below each of the at least two parameter labels are visible at the same time and the selectable objects are operable to configure an item.

24. The system according to claim 21, wherein the system is one of: a photocopier, a xerographic photocopier, a paper handler, a document finisher, a scanner, a printer, or a fax machine.

* * * * *